United States Patent [19]

Sjölander

[11] 4,407,829

[45] Oct. 4, 1983

[54] METHOD OF MANUFACTURING COLLAGEN PRODUCTS

[76] Inventor: Einar Sjölander, Prilyckegatan 87, 425 32 Hisings-Kärra, Sweden

[21] Appl. No.: 339,433

[22] PCT Filed: May 14, 1981

[86] PCT No.: PCT/SE81/00146

§ 371 Date: Jan. 7, 1982

§ 102(e) Date: Jan. 7, 1982

[87] PCT Pub. No.: WO81/03261

PCT Pub. Date: Nov. 26, 1981

[30] Foreign Application Priority Data

May 23, 1980 [SE] Sweden ................................ 8003876

[51] Int. Cl.³ .................. A22C 13/00; A23J 1/10; C07G 7/00
[52] U.S. Cl. ........................ 426/59; 426/32; 426/92; 426/140; 435/273
[58] Field of Search .............. 426/32, 57, 92, 59, 426/140; 435/265, 273

[56] References Cited

U.S. PATENT DOCUMENTS

| | | | |
|---|---|---|---|
| 2,973,302 | 2/1961 | Bloch et al. | 435/273 |
| 3,071,477 | 1/1963 | Klevens | 435/273 X |
| 3,373,046 | 3/1968 | Fagan | 426/57 |
| 3,664,844 | 5/1972 | Miller | 426/32 |
| 4,220,724 | 9/1980 | Berg et al. | 435/265 X |

FOREIGN PATENT DOCUMENTS

| | | |
|---|---|---|
| 1470904 | 4/1969 | Fed. Rep. of Germany . |
| 2127756 | 12/1971 | Fed. Rep. of Germany . |
| 325466 | 6/1970 | Sweden . |
| 393513 | 5/1977 | Sweden . |
| 978614 | 12/1964 | United Kingdom . |

OTHER PUBLICATIONS

0D043-01704, Dairy Sc. Abs., "Observations Concerning the Effect of Chemical and Enzymatic Modification of Collagen Upon Enzyme Immobilization", Barndt, R. L., Dissertation Abs. Intl., B, vol. 40, No. 7, 1980.
0D038-01790, Dairy Sc. Abs., "Immobilized Enzymes in Food and Microbial Processes", Olson, A. et al., London U.K., Plenum Press, 1974, Abstract of pp. 41-49.

*Primary Examiner*—Robert A. Yoncoskie
*Attorney, Agent, or Firm*—Dennison, Meserole, Pollack & Scheiner

[57] ABSTRACT

The present invention relates to the manufacture of a collagen slurry which can be used, inter alia, for manufacturing casings for food products. When manufacturing the slurry, various parts of the digestive system are used as starting material and are reduced and suspended, after which the collagen is extracted, cleaned and brought into a slurry state.

5 Claims, No Drawings sprayed over the product. The product with its coating of collagen slurry is passed through further baths in order to remove water from the collagen slurry (dehydrating in concentrated solution of $(NH_4)SO_4$ buffered to a pH value of 6 by the addition of $NaH_2PO_4/Na_2HPO_4$) to stabilize the collagen film formed by cross-linking between individual collagen molecules, collagen fibrils and/or units of collagen fibrils by reaction with glyoxal, glutaraldehyde or similar compounds, to wash off inorganic salts and to soften the film in a bath of polyalcohol, such as glycerol. The collagen casing is cured/aged in a flow of hot air to the extent permitted/required by the product. If the slurry with the collagen molecules is instead to be used to make a tube by means of extrusion, the mature slurry should be given a consistency suitable for an extruder. The slurry can in this case be extruded out into a bath with a concentrated solution of $(NH_4)_2SO_4$ buffered to a pH value of 6 by the addition of $NaH_2PO_4/Na_2HPO_4$, after which the film formed can be cross-linked in a bath containing cross-linking agent, washed and softened, and then cured/aged in hot air.

Matured slurry containing collagen molecules is a particularly advantageous starting material since the slurry can form a coherent network of slurry molecules if a cross-linking agent is added. A slurry of collagen molecules can thus be used for manufacturing surgical thread and for films of various types to be used in medical care as well as in other fields.

It has been mentioned above that a slurry is used containing collagen fibrils from the digestive organs and from other slaughter bi-products. A slurry containing said collagen molecules can be mixed with collagen fibrils from cutaneous fissures.

The following describes an example of producing a collagen slurry in accordance with the present invention.

EXAMPLE 100 kg of pig intestines, pig lungs or cow rumen are chopped into small pieces and washed in cold water. The pieces are frozen and supplied to a consumer who saws up the parts while still in frozen state. Sawed up parts in semi-frozen state are passed through a disintegrator such as a mincing machine having apertures about 3 mm in diameter. Intestine products are suspended in double quantities of water. A slurry is obtained. This is heated to about 40° C. The pH value is also adjusted to 8.3 using 4 M NaOH. Proteolytic enzyme (1 kg alkalas 0.6) is added to the slurry, the pH value being kept constant at 8.3 for 2 hours with the aid of 4 M NaOH. Released collagen is separated with the help of a self-emptying centrifuge. The separated collagen is washed in water. The collagent suspension is adjusted to a pH value of about 5.5 with the help odf hydrochloric acid. The dryness content is brought to a value of about 15%. After adjustment of the dryness content, the pH value is adjusted to 3 or 4 using lactic acid.

I claim:
1. A method for producing collagen fibrils from starting materials selected from animal digestive organs and slaughter biproducts comprising intestines, stomach, rumen, reticulum, third stomach, lungs and udders, comprising the steps of:
   (a) cleaning the starting materials;
   (b) reducing the starting materials into strips or pieces;
   (c) freezing the reduced starting materials;
   (d) mincing the frozen starting materials;
   (e) treating the minced materials in a first slurry of water and said minced materials to which is added a proteolytic enzyme in amounts to remove proteins other than collagen and to release collagen fibrils;
   (f) separating the collagen fibrils;
   (g) homogenizing the collagen fibrils in a first homogenization step at a pressure of from about 50 to about 300 kgpond/cm$^2$;
   (i) homogenizing the collagen fibrils adjusted with said acid in a second homogenization step;
   (h) forming a second slurry of water and from about 1.5 to about 15% by solids content of collagen fibrils and an acid in an amount to adjust the pH to about 2.5-4.5;
   (j) maturing the collagen fibrils in the second slurry for about 24 hours thereby facilitating the forming of individual fibrils; and
   (k) centrifuging the collagen fibril slurry to remove air bubbles, and thereby obtain said product.

2. A method for producing an edible product coated with said collagen fibrils prepared according to claim 1 comprising the steps of:
   (a) immersing an edible foodstuff in a bath of a collagen fibril slurry;
   (b) coating said edible foodstuff with collagen fibrils contained within said slurry;
   (c) dehydrating the collagen fibril coating on said edible foodstuff in a solution of concentrated $(NH_4)_2SO_4$ and a cross-linking agent to stabilize and cross-link said coating of collagen fibrils;
   (d) washing the thus treated edible foodstuff in a polyalcohol bath for a time sufficient to soften said coating; and
   (e) curing the edible foodstuff in hot air.

3. A method according to claim 1 wherein the acid is selected from the group consisting of lactic and hydrochloric acid.

4. A method according to claim 2 wherein said cross-linking agent is selected from the group comprising glyoxal, glutaraldehyde, ammonium chlorice and iron chloride.

5. A method according to claim 2 wherein said polyalcohol is glycerol.

* * * * *

METHOD OF MANUFACTURING COLLAGEN PRODUCTS

The present invention relates to a method of manufacturing a collagen slurry which can be used, inter alia, for making a casing for food products. Food products with casings are usually sausages and in this case it is desirable for the casing or sausage-skin to be edible. For this reason intestines from various animals have generally been used as sausage-skin. The dimensions of the sausages are in this case determined by the dimensions of the intestines. If sausage production is to be automated it is a drawback to use animal intestines as sausage-skin since the dimensions of the intenstines may always vary within certain limits. It is therefore desirable to be able to manufacture intestines mechanically, with exactly the dimensions desired by the sausage manufacturer. It has therefore also been suggested to manufacture sausage-skin from a slurrylike compound which is shaped to a tube by means of an extruder. The tube formed provides the sausage-skin and may be of either edible or inedible material. If the material is to be edible it should be made of collagen which is to be found, for instance, in intestines. Sausage-skin containing collagen is being produced. Collagen has always been extracted from cutaneous fissures. Since the cross-linking between the collagen fibrils in the cutaneous fissures is extremely strong, calcium must be used to release the collagen fibrils. The use of calcium in the manufacture of the collagen semi-manufacture is a drawback since treating the raw collagen product with calcium is both time-consuming and results in individual collagen molecules being released. This causes deterioration of the properties of the final product. Thus, obtaining a known collagen slurry involves the drawbacks mentioned above.

The object of the present invention is to obtain a collagen slurry using such parts of an animal as starting material in which the existing collagen fibrils can easily be released without a calcium process to assist in this. It has been discovered that the digestive organs contains collagen fibrils which are easier to release than the collagen fibrils in fissures, thus enabling release to be effected without affecting the physical properties of the fibrils. It has also proved easy to remove collagen fibrils from other slaughter products of an animal, such as the lungs, udders, etc. According to the invention, the organs of the digestive system of animals are preferably used, these being cleaned very carefully and reduced into strips or pieces which are then deep-frozen. The frozen product is minced and suspended in liquid together with an agent to release the collagen fibrils. Release collagen fibrils are collected and suspended, a substance being preferably added which causes the collagen fibrils to mature, i.e. brings them into a form facilitating filming and subsequent cross-linking of the molecules. A collagen slurry has now been obtained.

A suitable period for maturing is about 24 hours. After maturing the slurry or composition containing matured collagen fibrils should be subjected to a treatment to remove air bubbles. This is preferably done by centrifuge.

The slurry obtained can be used for various purposes. It can be used to form either a layer or a casing. Either before or after the formation of the layer or casing, an agent may be added to the slurry to promote cross-linking, said agent consisting of glutaraldehyde, glyoxal, aluminium chloride, iron chloride or the like, so that an edible end product is obtained. Prior to coating the slurry is given a suitable consistency to provide a bath into which food products can be immersed and obtain a casing, or a consistency enabling it to be extruded through an extruder to form a tube.

In order to age or cure the casing or layer formed it may be subjected to heat at a temperature in the vicinity of 60° C. or higher, within the range 70°–80° C. The curing or ageing is intended to reinforce the cross-linking already achieved and encouraged new cross-linking.

The following describes in more detail how a slurry is manufactured in which the food product can be immersed and provided with a casing and a slurry of a consistency enabling it to form a tube with the help of an extruder, which tube can be used as sausage-skin.

According to the invention or or more of the organs of the digestive system may be used, or one or more of other bi-products obtained when slaughtering animals and containing collagen fibres. However, it has been found best to use intestines as the starting material. The intestines are trimmed from the animal body, emptied and thoroughly cleaned. They are then cut into pieces about a centimeter in size. These pieces are then also cleaned and the chopped intestines are deep-frozen. The frozen pieces are disintegrated, preferably at low temperature, a temperature less than 10° C., for instance, to pieces some millimeter in size. A mincing machine having a disc with holes about 3 mm in diameter may be used. The minced intestine is suspended in water. 200 g of minced intestine should suitably be suspended in about 1000 ml water. The suspension is known as a slurry and has a pH value of about 6.8. The slurry is heated to around 40° C. and its pH value adjusted to 8.3 with the help of sodium hydroxide. 1.3 ml 4 M NaOH was used per 200 g minced intestine in about 1000 ml water. A proteolytic enzyme such as alkalas from the Danish company Novo is added to the 40° C. slurry. The purpose of the enzyme is to wash away proteins other than collagen and this is done by hydrolysis of these proteins. A suitable hydrolysis time is 2–5 hours. A suitable quantity of enzyme is about 60 Anson units per kilogram dry substance. The collagen fibres of the intestine are also released during hydrolysis. The collagen fibres are suitably collected from the slurry and washed extremely carefully so that both enzyme and hydrolysis products are removed. Any fat remnants can be removed from the collagen, if necessary, by extraction with a solvent. The collagen molecules can be washed with distilled water. From 200 g minced intestine, (wet weight) 87 g collagen fibres (wet weight) are obtained, having a pH value of about 8.2. The collagen fibres are homogenized in a mixer at a pressure of 50–300 kgpond/cm$^2$. The collagen molecules are mixed with liquid to give a slurry with a solids content of 1.5–15%. Lactic acid is added to the slurry to give a pH value of about 2.5–4.5. To assist release of the individual collagen fibrils, the slurry is homogenized in an apparatus causing the collagen unit to be subjected to considerable shearing forces. After this the slurry is allowed to mature for about 24 hours. During the maturing process individual collagen fibrils are released and/or less fibril unit is formed. After maturing the slurry is centrifuged in order to remove the air bubbles whipped in during the homogenization. Thereafter it is given a suitable consistency for use as a bath for food products. Foodstuffs to be provided with a casing are then immersed in the bath of collagen slurry or the collagen slurry

UNITED STATES PATENT OFFICE
CERTIFICATE OF CORRECTION

Patent No. 4,407,829            Dated October 4, 1983

Inventor(s) Einar Sjolander

It is certified that error appears in the above-identified patent and that said Letters Patent are hereby corrected as shown below:

Claim 1, steps (h) and (i) are reversed in order.

Step (h) forming a second slurry.....

should appear before

Step (i) homogenizing the collagen fibrils.....

*Signed and Sealed this*

*Third* Day of *January 1984*

[SEAL]

*Attest:*

*Attesting Officer*         GERALD J. MOSSINGHOFF
                                  *Commissioner of Patents and Trademarks*